United States Patent [19]

Nakagawa et al.

[11] Patent Number: 5,299,234
[45] Date of Patent: Mar. 29, 1994

[54] STS-1 SIGNAL PROCESSING METHOD AND DEVICE WHICH CAN PREVENT SUBSEQUENT TERMINAL EQUIPMENT FROM GENERATING UNNECESSARY ALARM

[75] Inventors: Tatsuhiko Nakagawa, Tokyo; Kinya Endo, Miyagi, both of Japan

[73] Assignee: NEC Corporation, Japan

[21] Appl. No.: 948,214

[22] Filed: Sep. 21, 1992

[30] Foreign Application Priority Data

Sep. 19, 1991 [JP] Japan .................................. 3-268326

[51] Int. Cl.$^5$ .............................................. H04L 7/00
[52] U.S. Cl. ..................................... 375/112; 370/102
[58] Field of Search ................... 375/104, 112; 370/84, 370/94.2, 102

[56] References Cited

U.S. PATENT DOCUMENTS

| | | | |
|---|---|---|---|
| 5,030,951 | 7/1991 | Edo et al. ............................. | 370/102 |
| 5,111,485 | 5/1992 | Serack .................................. | 375/112 |
| 5,157,655 | 10/1992 | Hamlin, Jr. et al. .................. | 370/102 |
| 5,235,332 | 8/1993 | Stephenson, Jr. .................... | 375/112 |

OTHER PUBLICATIONS

American National Standard for Telecommunications–Digital Hierarchy–Optical Interface Rates and Specifications (SONET)T1X1.5/90-025R3/T1X1/-90-055R2, Draft-Nov. 1990; Published by American National Standards Institute, Inc.

*Primary Examiner*—Curtis Kuntz
*Assistant Examiner*—T. Ghebrehnsae
*Attorney, Agent, or Firm*—Ostrolenk, Faber, Gerb & Soffen

[57] ABSTRACT

In a processing device for processing an STS-1 signal (10) into a DS-3 signal (11), an output circuit (19) outputs an idle code signal when a judging circuit (16) judges that a detected STS path signal label part indicates that an STS synchronous payload envelope of the STS-1 signal is unequipped or unused. The idle code signal represents an idle code prescribed for the DS-3 signal and is generated by a generator (18). The detected STS path signal label part is produced by a detecting circuit (12, 15) which detects an STS path signal label part from STS path overheads of successive subframes of the STS synchronous payload envelope. The judging circuit judges whether or not the detected STS path signal label part indicates that the STS synchronous payload envelope is unequipped. An extracting circuit (17) successively extracts information parts of payloads of the subframes of the STS synchronous payload envelope from the STS-1 signal as a succession of extracted information parts. The output circuit outputs the succession of the extracted information parts as the DS-3 signal when the judging circuit judges that the detected STS path signal label part indicates that the STS synchronous payload envelope is not unequipped. On processing a VT into a DS-1 signal, use is made of another idle code prescribed for the DS-1 signal.

3 Claims, 5 Drawing Sheets

STS-1 SIGNAL PROCESSING METHOD AND DEVICE WHICH CAN PREVENT SUBSEQUENT TERMINAL EQUIPMENT FROM GENERATING UNNECESSARY ALARM

BACKGROUND OF THE INVENTION

This invention relates to a method and a device for processing an STS-1 signal (namely, a synchronous transport signal level 1) into a DS-3 signal (that is, a digital signal level 3). This invention relates also to another method for processing a VT (virtual tributary) into a DS-1 signal (namely, a digital signal level 1).

The STS-1 signal and the VT are prescribed in the American National Standard for Telecommunications-Digital Hierarchy-Optical Interface Rates and Specifications (SONET), T1X1.5/90-025R3/T1X1/90-055R2, Draft-November 1990, pages 9-23, published by American National Standards Institute, Inc.

As prescribed in the above-mentioned Standard on Paragraph 5, pages 14-15, the STS-1 signal has a bit rate of 51.840 Mbits/s. The STS-1 signal comprises an STS synchronous payload envelope (STS-1 SPE) comprising first through M-th subframes, where M represents a plural natural number. In a practical use, M is equal to 9. Each of the first through the M-th subframes comprising an STS path overhead (STS-1 POH) and a payload comprising an information part.

As also prescribed in the above-mentioned Standard on page 21, a predetermined one of the STS path overheads of the first through M-th subframes is allocated as an STS path signal label part to indicate whether or not the STS synchronous payload envelope is unequipped. The STS path signal label part indicates an unequipped code consisting of all zero bits when the STS synchronous payload envelope is unequipped. In the practical use, the STS path overhead of a third subframe is allocated as the STS path signal label part.

The information parts of the payloads of the first through the M-th subframes are used in transporting the DS-3 signal when the STS synchronous payload envelope is not unequipped. When the STS synchronous payload envelope is not unequipped, the STS-1 signal is practically used. When the STS synchronous payload envelope is unequipped, the STS-1 signal is not used and is therefore referred to as an unused STS-1 signal. The DS-3 signal has a bit rate of 44.736 Mbits/s. At any rate, the DS-3 signal can be transported by the STS synchronous payload envelope.

Inasmuch as the DS-1 signal has a lower bit rate of 1.544 Mbits/s relative to the DS-3 signal, the DS-1 signal is transferred by the VT of size x defined in the STS synchronous payload envelope as prescribed in the above-mentioned Standard on the left-hand column of page 15. For example, the VT of size 1.5 has a bit rate of 1.728 Mbits/s as prescribed in the above-mentioned Standard on Paragraph 8.1.3 of page 16.

The VT of size x comprises a VT synchronous payload envelope (VT SPE). The VT synchronous payload envelope comprises a VT path overhead (VT POH) and a payload comprising an information part. A part of the VT path overhead is allocated as a VT path signal label part to indicate whether or not the VT synchronous payload envelope is unequipped. The VT path signal label part indicates an unequipped code consisting of all zero bits when the VT synchronous payload envelope is unequipped. The information part of the payload of the VT synchronous payload envelope is used in transporting the DS-1 signal when the VT synchronous payload envelope is not unequipped. When the VT synchronous payload envelope is not unequipped, the VT of size x is practically used. When the VT synchronous payload envelope is unequipped, the VT in question is not used and is therefore called an unused VT.

As mentioned above, the above-mentioned Standard prescribes that the unequipped code should be set in the STS path signal label part for the unused STS-1 signal and that the unequipped code should be set in the VT path signal label part for the unused VT of size x. However, inasmuch as the above-mentioned Standard never prescribes as regards both the information parts of the payloads of the first through the M-th subframes of the STS synchronous payload envelope for the unused STS-1 signal and the information part of the payload of the VT synchronous payload envelope for the unused VT of size x, an unprescribed code consisting of, for example, all zero bits is inevitably transported by the information parts of the unused STS-1 signal and by the information part of the unused VT of size x.

When the unused STS-1 signal and the unused VT of size x are processed in conventional processing devices, every one of the conventional processing devices produces or outputs the unprescribed code instead of the DS-3 and the DS-1 signals. A subsequent terminal equipment unavoidably generates an unnecessary alarm in response to the unprescribed code.

SUMMARY OF THE INVENTION

It is therefore an object of this invention to provide a method for processing a STS-1 signal into a DS-3 signal, which method can prevent a subsequent terminal equipment from generating an unnecessary alarm.

It is a specific object of this invention to provide a device for processing a STS-1 signal into a DS-3 signal, which device can prevent a subsequent terminal equipment from generating an unnecessary alarm.

It is a different object of this invention to provide a method for processing a VT into a DS-1 signal, which method can prevent a subsequent terminal equipment from generating an unnecessary alarm.

Other objects of this invention will become clear as the description proceeds.

On describing the gist of an aspect of this invention, it is possible to understand that a method is for processing an STS-1 signal into a DS-3 signal. The STS-1 signal comprises an STS synchronous payload envelope comprising first through M-th subframes, where M represents a plural natural number. Each of the first through the M-th subframes comprises an STS path overhead and a payload comprising an information part. A predetermined one of the STS path overheads of the first through M-th subframes is allocated as an STS path signal label part to indicate whether or not the STS synchronous payload envelope is unequipped. The information parts of the payloads of the first through the M-th subframes are used in transporting the DS-3 signal when the STS synchronous payload envelope is not unequipped.

According to this aspect of this invention, the above-understood method comprises the steps of: detecting the STS path signal label part from the STS path overheads of the first through the M-th subframes of the STS synchronous payload envelope of the STS-1 signal as a detected STS path signal label part; judging whether or not the detected STS path signal label part indicates that the STS synchronous payload envelope is unequipped; successively extracting the information parts of the payload of the first through the M-th subframes of the STS synchronous payload envelope from the STS-1 signal as a succession of extracted information parts; generating an idle code signal representing an idle code prescribed for the DS-3 signal; and outputting the succession of the extracted information parts as the DS-3 signal when the judging step judges that the detected STS path signal label part indicates that the STS synchronous payload envelope is not unequipped. The outputting step is for outputting the idle code signal when the judging step judges that the detected STS path signal label part indicates that the STS synchronous payload envelope is unequipped.

On describing the gist of a specific aspect of this invention, it is possible to understand that a processing device is for processing an STS-1 signal into a DS-3 signal. The STS-1 signal comprises an STS synchronous payload envelope comprising first through M-th subframes, where M represents a plural natural number. Each of the first through the M-th subframes comprises an STS path overhead and a payload comprising an information part. A predetermined one of the STS path overheads of the first through the M-th subframes is allocated as an STS path signal label part to indicate whether or not the STS synchronous payload envelope is unequipped. The information parts of the payloads of the first through the M-th subframes are used in transporting the DS-3 signal when the STS synchronous payload envelope is not unequipped.

According to the specific aspect of this invention, the above-understood device comprises: detecting means supplied with the STS-1 signal for detecting the STS path signal label part from the STS path overheads of the first through the M-th subframes of the STS synchronous payload envelope as a detected STS path signal label part; judging means connected to the detecting means for judging whether or not the detected STS path signal label part indicates that the STS synchronous payload envelope is unequipped; extracting means supplied with the STS-1 signal for successively extracting the information parts of the payloads of the first through the M-th subframes from the STS-1 signal as a succession of extracted information parts; generating means for generating an idle code signal representing an idle code prescribed for the DS-3 signal; and outputting means connected to the judging, the extracting, and the generating means for outputting the succession of the extracted information parts as the DS-3 signal when the judging means judges that the detected STS path signal label part indicates that the STS synchronous payload envelope is not unequipped. The outputting means is for outputting the idle code signal when the judging means judges that the detected STS path signal label part indicates that the STS synchronous payload envelope is unequipped.

On describing the gist of a different aspect of this invention, it is possible to understand that a method is for processing a VT into a DS-1 signal. The VT comprises a VT synchronous payload envelope. The VT synchronous payload envelope comprises a VT path overhead and a payload comprising an information part. A part of the VT path overhead is allocated as a VT path signal label part to indicate whether or not the VT synchronous payload envelope is unequipped. The information part of the payload of the VT synchronous payload envelope is used in transporting the DS-1 signal when the VT synchronous payload envelope is not unequipped.

According to the different aspect of this invention, the above-understood method comprises the steps of: detecting the VT path signal label part from the VT path overhead of the VT synchronous payload envelope of the VT as a detected VT path signal label part; judging whether or not the detected VT path signal label part indicates that the VT synchronous payload envelope is unequipped; extracting the information part of the VT synchronous payload envelope from the VT as an extracted information part; generating an idle code signal representing an idle code prescribed for the DS-1 signal; and outputting the extracted information part as the DS-1 signal when the judging step judges that the detected VT path signal label part indicates that the VT synchronous payload envelope is not unequipped. The outputting step is for outputting the idle code signal when the judging step judges that the detected VT path signal label part indicates that the VT synchronous payload envelope is unequipped.

DESCRIPTION OF THE PREFERRED EMBODIMENTS

Figure 1:
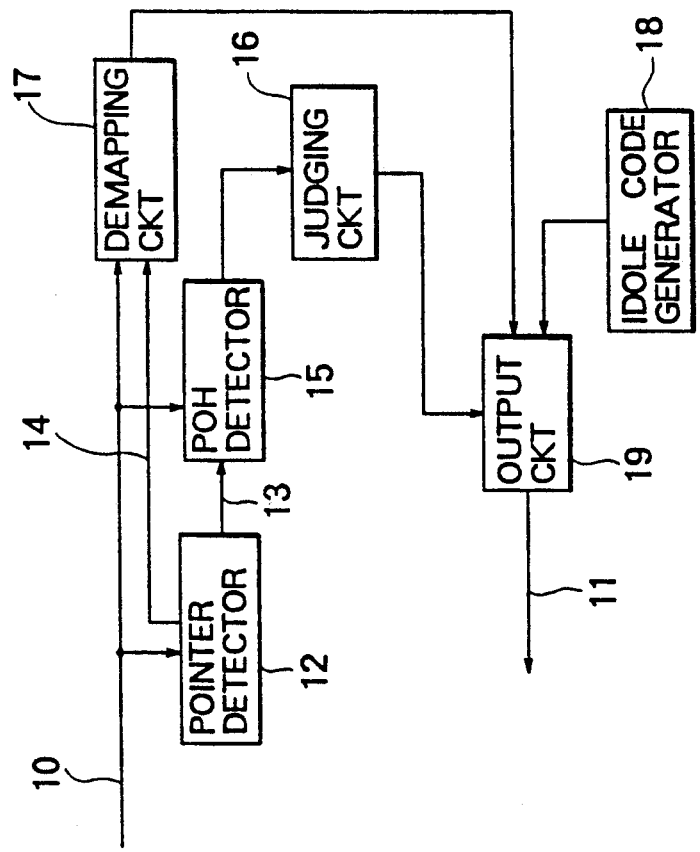
FIG. 1 is a block diagram of a processing device for carrying out a method according to a first embodiment of this invention.

Referring to FIG. 1, description will be made as regards a processing device for carrying out a method according to a first embodiment of this invention. The processing device carries out the method of processing an STS-1 signal 10 into a DS-3 signal 11.

The processing device is included in an SONET (synchronous optical network) terminal equipment (not shown) which receives an SONET signal which is typically an optical carrier level N signal (that is, an OC-N signal), where N represents a plural integer. The SONET terminal equipment comprises a receiving section (not shown) which has a combination of a photoelectric converter (not shown) and a demultiplexer (not shown) and which converts and demultiplexes the OC-N signal into first through N-th STS-1 signal. The processing device receives one of the first through the N-th STS-1 signal as the STS-1 signal 10.

Figure 2:
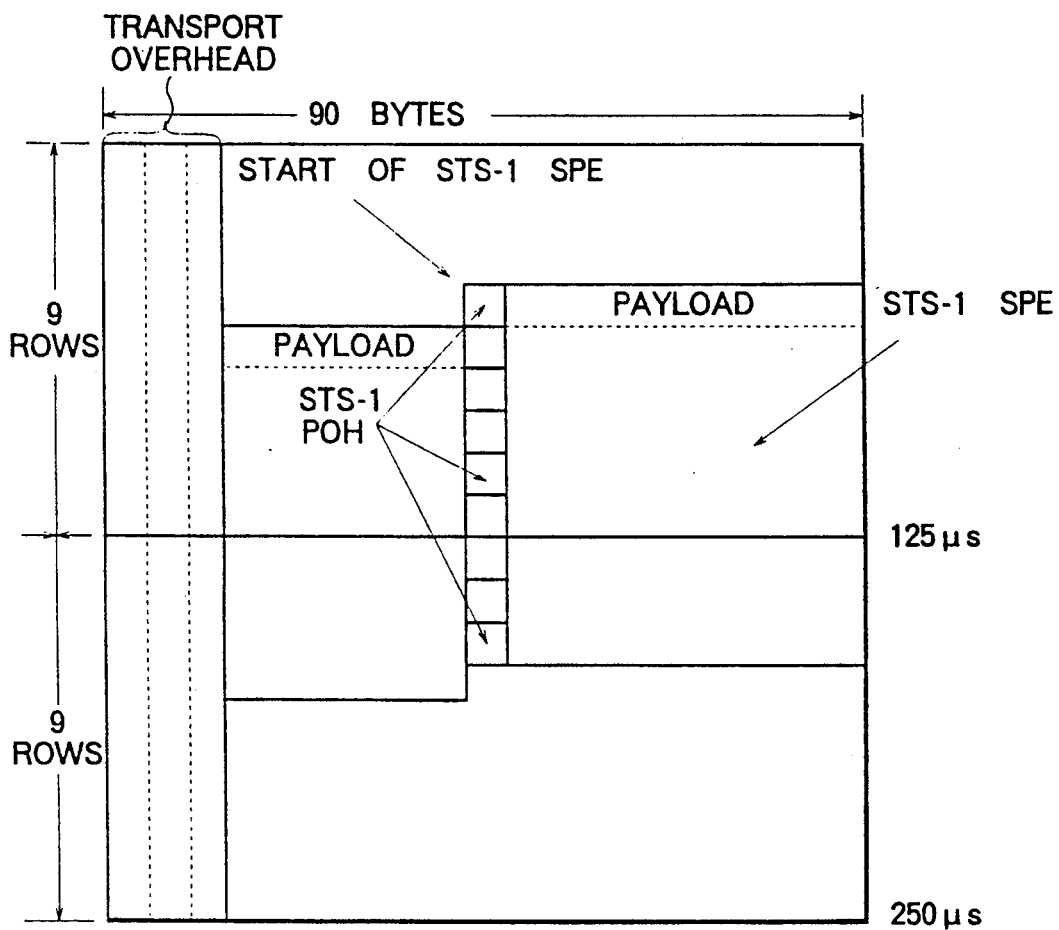
FIG. 2 is a diagram for use in describing an STS-1 signal.

Turning to FIG. 2, the STS-1 signal comprises first through ninth rows, each of which comprises first through ninetieth bytes (octets) or columns. Each byte consists of eight bits. First through third bytes of the first through the ninth rows serve as a transport overhead known in the art. Remaining bytes (that is, fourth through ninetieth bytes) of the first through the ninth rows serve as an STS synchronous payload envelope (STS-1 SPE). The STS synchronous payload envelope (STS-1 SPE) may begin or start anywhere in a STS envelope capacity as illustrated in FIG. 2. The transport overhead comprises a payload pointer (not shown)

which designates a location of the byte of a start of the STS synchronous payload envelope (STS-1 SPE).

The STS synchronous payload envelope (STS-1 SPE) successively comprises first through M-th subframes, where M represents a plural natural number. The STS synchronous payload envelope (STS-1 SPE) being illustrated, comprises first through ninth subframes. Each of the first through the ninth subframes comprises an STS path overhead (STS-1 POH) and a payload.

Figure 3:
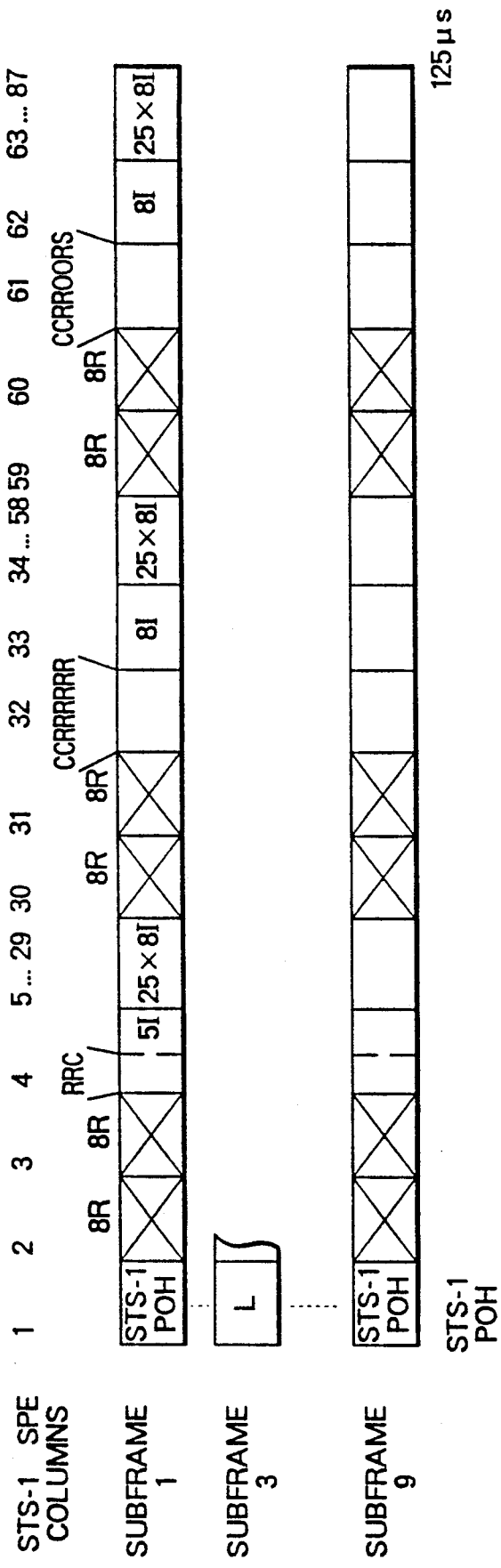
FIG. 3 is a diagram for use in describing subframes of a STS synchronous payload envelope (STS-1 SPE) of the STS-1 signal of FIG. 2.

Turning to FIG. 3, the subframes will be described more in detail. Each of the first through the ninth subframes comprises the STS path overhead (STS-1 POH) at a first column or byte of the STS synchronous payload envelope (STS-1 SPE) and the payload at second through eighty-seventh columns or bytes. The payload of each of the first through the ninth subframes comprises an information part designated by 5I, 25×8I, and 8I, where I represents an information bit. In FIG. 3, R, C, S, and O represent a fixed stuff bit, a stuff control bit, a stuff opportunity bit, and an overhead communications channel bit, respectively. The bits R, C, S, and O are known in the art. The STS path overhead (STS-1 POH) of a third subframe is allocated as an STS path signal label part designated by L. The STS path signal label part L indicates whether or not the STS synchronous payload envelope (STS-1 SPE) is unequipped. The STS path signal label part L indicates an unequipped code consisting of all zero bits when the STS synchronous payload envelope (STS-1 SPE) is unequipped.

The information parts of the payloads of the first through the ninth subframes are used in transporting the DS-3 signal when the STS synchronous payload envelope (STS-1 SPE) is not unequipped. When the STS synchronous payload envelope (STS-1 SPE) is not unequipped, the STS-1 signal is practically used. When the STS synchronous payload envelope (STS-1 SPE) is unequipped, the STS-1 signal is not used and is therefore an unused STS-1 signal as described in the preamble of the instant specification. At any rate, the DS-3 signal can be transported by the STS synchronous payload envelope (STS-1 SPE).

Turning back to FIG. 1 with reference to FIGS. 2 and 3 continued, the processing device comprises a pointer detector 12 supplied with the STS-1 signal 10. The pointer detector 12 detects, from the transport overhead, the payload pointer which designates the location of the byte of the start of the STS synchronous payload envelope (STS-1 SPE). The pointer detector 12 produces path overhead extraction timing pulses 13 and payload extraction timing pulses 14. Supplied with the STS-1 signal 10 and with the path overhead extraction timing pulses 13, a path overhead (POH) detector 15 selects a third one of the path overhead extraction timing pulses 13 and detects the STS path signal label part L from the STS path overheads (STS-1 POH) of the first through the ninth subframes of the STS synchronous payload envelope (STS-1 SPE) as a detected STS path signal label part.

Thus, the path overhead (POH) detector 15 serves in cooperation with the pointer detector 12 as a detecting circuit. Supplied with the STS-1 signal 10, the detecting circuit detects the STS path signal label part L from the STS path overheads (STS-1 POH) of the first through the ninth subframes of the STS synchronous payload envelope (STS-1 SPE) as the detected STS path signal label part.

Connected to the path overhead detector 15 of the detecting circuit, a judging circuit 16 judges whether or not the detected STS path signal label part indicates that the STS synchronous payload envelope (STS-1 SPE) is unequipped.

Supplied with the STS-1 signal 10, a demapping circuit 17 successively extracts, with reference to the payload extraction timing pulses 14, the information parts of the payloads of the first through the ninth subframes from the STS-1 signal 10 and temporarily memorizes the information parts of the payloads of the first through the ninth subframes as a succession of extracted information parts.

Thus, the demapping circuit 17 serves in cooperation with the pointer detector 12 as an extracting circuit. Supplied with the STS-1 signal 10, the extracting circuit successively extracts the information parts of the payloads of the first through the ninth subframes from the STS-1 signal 10 as the succession of extracted information parts.

An idle code generator 18 generates an idle code signal representing an idle code which is prescribed for the DS-3 signal. The idle code consists of a sequence of bits 1100 . . . as known in the art.

An output circuit 19 is connected to the judging circuit 16, the demapping circuit 17, and the idle code generator 18. The output circuit 19 selects and outputs the succession of the extracted information parts as the DS-3 signal 11 when the judging circuit 16 judges that the detected STS path signal label part indicates that the STS synchronous payload envelope (STS-1 SPE) is not unequipped. The output circuit 19 selects and outputs the idle code signal when the judging circuit 19 judges that the detected STS path signal label part indicates that the STS synchronous payload envelope (STS-1 SPE) is unequipped.

When the unused STS-1 signal is processed in the processing device, the processing device produces or outputs the idle code signal instead of the DS-3 signal 11 and delivers the idle code signal to a subsequent terminal equipment. Inasmuch as the idle code signal represents the idle code which is prescribed for the DS-3 signal and is not the unprescribed code described in the preamble of the instant specification, the processing device can prevent the subsequent terminal equipment from generating an unnecessary alarm due to the unprescribed code.

Figure 4:
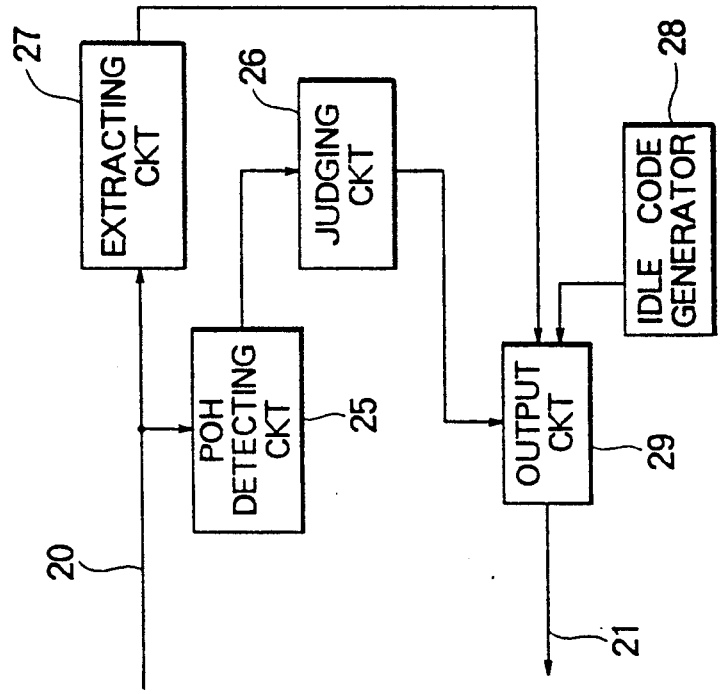
FIG. 4 is a block diagram of a processing device for carrying out a method according to a second embodiment of this invention.

Turning to FIG. 4, description will proceed to another processing device for carrying out a method according to a second embodiment of this invention. The processing device carries out the method of processing a VT 20 of size 1.5 into a DS-1 signal 21. The DS-1 signal is transferred by the VT 20 of size 1.5 defined in the STS synchronous payload envelope (STS-1 SPE) of the STS-1 signal as mentioned in the preamble of the instant specification.

Figure 5:
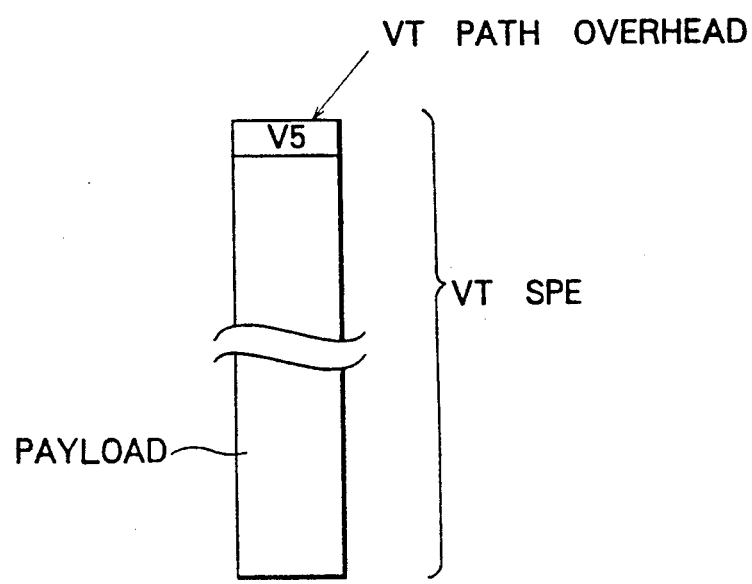
FIG. 5 is a diagram for use in describing a VT.

Turning to FIG. 5, the VT of size 1.5 comprises a VT synchronous payload envelope (VT SPE). The VT synchronous payload envelope (VT SPE) comprises a VT path overhead (V5) and a payload comprising an information part. The VT path overhead (V5) is positioned at a first byte of the VT synchronous payload envelope (VT SPE). Remaining bytes of the VT synchronous payload envelope (VT SPE) are for the payload. A part (that is, fifth through seventh bits) of the VT path overhead (V5) is allocated as a VT path signal label part to indicate whether or not the VT synchronous payload envelope (VT SPE) is unequipped. The VT path signal label part indicates an unequipped code consisting of all zero bits when the VT synchronous payload envelope (VT SPE) is unequipped. The information part of the payload of the VT synchronous payload envelope (VT SPE) is used in transporting the DS-1 signal when the VT synchronous payload envelope (VT SPE) is not unequipped. When the VT synchronous payload envelope is not unequipped, the VT of size 1.5 is practically used. When the VT synchronous payload envelope (VT SPE) is unequipped, the VT in question is not used and is therefore an unused VT as described in the preamble of the instant specification.

Turning back to FIG. 4 with reference to FIG. 5 continued, the processing device comprises a path overhead (POH) detecting circuit 25 supplied with the VT 20 of size 1.5. The path overhead detecting circuit 25 detects the VT path signal label part from the VT path overhead (V5) of the VT synchronous payload envelope (VT SPE) of the VT 20 of size 1.5 as a detected VT path signal label part.

Connected to the path overhead detecting circuit 25, a judging circuit 26 judges whether or not the detected VT path signal label part indicates that the VT synchronous payload envelope (VT SPE) is unequipped.

Supplied with the VT 20 of size 1.5, an extracting circuit 27 extracts the information part of the VT synchronous payload envelope (VT SPE) from the VT of size 1.5 as an extracted information part.

A code generator 28 generates an idle code signal representing an idle code which is prescribed for the DS-1 signal. The idle code consists of, for example, all "1" bits as known in the art.

Connected to the judging circuit 26, the extracting circuit 27, and the idle code generator 28, an output circuit 29 outputs the extracted information part as the DS-1 signal 21 when the judging circuit 26 judges that the detected VT path signal label part indicates that the VT synchronous payload envelope (VT SPE) is not unequipped. The output circuit 29 outputs the idle code signal when the judging circuit 26 judges that the detected VT path signal label part indicates that the VT synchronous payload envelope (VT SPE) is unequipped.

When the unused VT of size 1.5 is processed in the processing device, the processing device outputs the idle code signal instead of the DS-1 signal 21 and delivers the idle code signal to a subsequent terminal equipment. Inasmuch as the idle code signal represents the idle code which is prescribed for the DS-1 signal in the above-mentioned Standard and is not the unprescribed code described in the preamble of the instant specification, the processing device can prevent the subsequent terminal equipment from generating an unnecessary alarm in response to the unprescribed code.

What is claimed is:

1. A method of processing an STS-1 signal into a DS-3 signal, said STS-1 signal comprising an STS synchronous payload envelope comprising first through M-th subframes, where M represents a plural natural number, each of said first through said M-th subframes comprising an STS path overhead and a payload comprising an information part, a predetermined one of the STS path overheads of said first through M-th subframes being allocated as an STS path signal label part to indicate whether or not said STS synchronous payload envelope is unequipped, the information parts of the payloads of said first through said M-th subframes being used in transporting said DS-3 signal when said STS synchronous payload envelope is not unequipped, said method comprising the steps of:

detecting said STS path signal label part from the STS path overheads of said first through said M-th subframes of said STS synchronous payload envelope of said STS-1 signal as a detected STS path signal label part;

judging whether or not said detected STS path signal label part indicates that said STS synchronous payload envelope is unequipped;

successively extracting the information parts of the payloads of said first through said M-th subframes of said STS synchronous payload envelope from said STS-1 signal as a succession of extracted information parts;

generating an idle code signal representing an idle code prescribed for said DS-3 signal; and outputting said succession of the extracted information parts as said DS-3 signal when said judging step judges that said detected STS path signal label part indicates that said STS synchronous payload envelope is not unequipped, said outputting step being for outputting said idle code signal when said judging step judges that said detected STS path signal label part indicates that said STS synchronous payload envelope is unequipped.

2. A processing device for processing an STS-1 signal into a DS-3 signal, said STS-1 signal comprising an STS synchronous payload envelope comprising first through M-th subframes, where M represents a plural natural number, each of said first through said M-th subframes comprising an STS path overhead and a payload comprising an information part, a predetermined one of the STS path overheads of said first through said M-th subframes being allocated as an STS path signal label part to indicate whether or not said STS synchronous payload envelope is unequipped, the information parts of the payloads of said first through said M-th subframes being used in transporting said DS-3 signal when said STS synchronous payload envelope is not unequipped, said device comprising:

detecting means supplied with said STS-1 signal for detecting said STS path signal label part from the STS path overheads of said first through said M-th subframes of said STS synchronous payload envelope as a detected STS path signal label part;

judging means connected to said detecting means for judging whether or not said detected STS path signal label part indicates that said STS synchronous payload envelope is unequipped;

extracting means supplied with said STS-1 signal for successively extracting the information parts of the payloads of said first through said M-th subframes from said STS-1 signal as a succession of extracted information parts;

generating means for generating an idle code signal representing an idle code prescribed for said DS-3 signal; and outputting means connected to said judging, said extracting, and said generating means for outputting said succession of the extracted information parts as said DS-3 signal when said judging means judges that said detected STS path signal label part indicates that said STS synchronous payload envelope is not unequipped, said outputting means being for outputting said idle code signal when said judging means judges that said detected STS path signal label part indicates that said STS synchronous payload envelope is unequipped.

3. A method of processing a VT into a DS-1 signal, said VT comprising a VT synchronous payload envelope, said VT synchronous payload envelope comprising a VT path overhead and a payload comprising an information part, a part of said VT path overhead being allocated as a VT path signal label part to indicate whether or not said VT synchronous payload envelope is unequipped, said information part of said payload of said VT synchronous payload envelope being used in transporting said DS-1 signal when said VT synchronous payload envelope is not unequipped, said method comprising the steps of:

detecting said VT path signal label part from said VT path overhead of said VT synchronous payload envelope of said VT as a detected VT path signal label part;

judging whether or not said detected VT path signal label part indicates that said VT synchronous payload envelope is unequipped;

extracting the information part of said payload of said VT synchronous payload envelope from said VT as an extracted information part;

generating an idle code signal representing an idle code prescribed for said DS-1 signal; and outputting said extracted information part as said DS-1 signal when said judging step judges that said detected VT path signal label part indicates that said VT synchronous payload envelope is not unequipped, said outputting step being for outputting said idle code signal when said judging step judges that said detected VT path signal label part indicates that said VT synchronous payload envelope is unequipped.

* * * * *